United States Patent [19]

Maeland et al.

[11] 4,440,736
[45] Apr. 3, 1984

[54] TITANIUM-BASED BODY-CENTERED CUBIC PHASE ALLOY COMPOSITIONS AND ROOM TEMPERATURE HYDRIDE-FORMING REACTIONS OF SAME

[75] Inventors: Arnulf J. Maeland, Succasunna; George G. Libowitz, Brookside; George Rak, Pinebrook, all of N.J.

[73] Assignee: Allied Corporation, Morris Township, Morris County, N.J.

[21] Appl. No.: 490,599

[22] Filed: May 2, 1983

Related U.S. Application Data

[63] Continuation-in-part of Ser. No. 420,465, Sep. 20, 1982, abandoned.

[51] Int. Cl.$^3$ .............................................. C01B 6/24
[52] U.S. Cl. .................................. 423/644; 252/181.6; 420/900; 148/421; 148/422; 148/423; 148/442
[58] Field of Search .................... 423/644; 420/900; 148/421, 422, 423, 442

[56] References Cited

U.S. PATENT DOCUMENTS

| 3,922,872 | 2/1975 | Reilly et al. | 62/48 |
|---|---|---|---|
| 4,075,312 | 2/1978 | Tanaka et al. | 423/644 |
| 4,195,989 | 4/1980 | Gamo et al. | 423/644 |
| 4,278,466 | 7/1981 | Pous | 423/644 |
| 4,283,226 | 8/1981 | van Mal et al. | 423/644 |
| 4,349,527 | 9/1982 | Amano et al. | 423/644 |
| 4,358,316 | 11/1982 | Liu et al. | 423/644 |
| 4,370,163 | 1/1983 | Moriwaki et al. | 423/644 |

FOREIGN PATENT DOCUMENTS 56-112436  9/1981  Japan .................................. 420/900

OTHER PUBLICATIONS

W. Heller, "Metallkundliche Untersuchungen Von Phasengleichgenwichten im Dreistoffsystem Titan-Niob-Germanium," Z. Metallkde, 64 (1973) 124–128.

J. J. Reilly and R. H. Wiswall, Jr., *Inorganic Chemistry,* vol. 13, No. 1, (1974), 218–222 "Formation and Properties of Iron Titanium Hydride".

*Primary Examiner*—Herbert T. Carter
*Attorney, Agent, or Firm*—Thomas D. Hoffman; Alan M. Doernberg; Gerhard H. Fuchs

[57] ABSTRACT

Solid solutions of titanium, a second metal such as niobium, vanadium, and molybdenum and a third metal such as cobalt, germanium, or iron, wherein the second metal is niobium or vanadium and optionally when the second metal is molybdenum, react rapidly at room temperature obviating the need for a high temperature induction period. Solid solutions having formula $(Ti_{1-x}Nb_x)_{1-y}M_y$ wherein $0.25 \leq x \leq 0.95$ and wherein y varies from at least about 0.01 to the solubility limit of M such as cobalt, germanium, or iron in said solution, are also disclosed. Hydrides of solid solution alloys of Ti/Mo/M, Ti/Nb/M and Ti/V/M are also disclosed.

11 Claims, No Drawings

TITANIUM-BASED BODY-CENTERED CUBIC PHASE ALLOY COMPOSITIONS AND ROOM TEMPERATURE HYDRIDE-FORMING REACTIONS OF SAME

DESCRIPTION

CROSS-REFERENCE TO RELATED APPLICATIONS

This application is a continuation-in-part of our copending U.S. patent application Ser. No. 420,465, filed Sept. 20, 1982, and now abandoned and is related to our copending U.S. patent application Ser. No. 365,119, filed Apr. 5, 1982, which is a continuation-in-part of our copending U.S. patent application Ser. No. 320,391, filed Nov. 12, 1981 and now abandoned.

BACKGROUND OF THE INVENTION

The present invention relates to the reaction of hydrogen gas with titanium-based metal alloys, and particularly to the rapid reaction at mild temperatures of hydrogen gas with solid solution alloys having a body-centered cubic phase structure comprising titanium and a second metal selected from a group consisting of molybdenum, vanadium, and niobium and dissolved in the binary alloy having said body-centered cubic phase structure wherein said second metal is vanadium or niobium and optionally molybdenum at least about 1 atom percent of a third metal such as aluminum, cobalt or iron.

Most metals that form hydrides react very slowly in bulk form at room temperature with hydrogen gas. Metallic niobium and metallic vanadium, for example, are relatively inert in bulk form at room temperature in the presence of hydrogen gas, with the hydrogen only slowly reacting with the body-centered cubic phase structure of each metal to form a precipitated niobium hydride or vanadium hydride. Most other metals that form hydrides react in a similar fashion, with the rate of alpha phase formation and hydride formation varying among metals and alloys, but rarely occurring at room temperature in less than one hour. In the case of niobium, attempts to increase this rate by plating over niobium with nickel or palladium or iron have been reported.

Metallic titanium is also relatively inert in the bulk form at room temperature in the presence of hydrogen gas with hydrogen dissolving only slowly reacting with hexagonal close packed phase structure of metal to form a precipitated titanium hydride.

For many applications of metal hydrides, such as hydrogen recovery, it is desirable to form the hydride from bulk metal, pulverize the hydride into some form of granular or powder structure, and thereafter cyclically remove hydrogen to form a lower hydride or the free metal and thereafter reintroduce hydrogen to reform the hydride. Starting with bulk metal or bulk alloy, it is normally necessary to go through an induction period, wherein the metal is heated to a temperature such as 300°–700° C., then reacted with hydrogen at high pressure and then cooled very slowly until a temperature below about 100° C., and preferably about room temperature, is reached. At the higher temperature, the rate of hydrogen dissolving in the metal (the alpha phase) is increased so as to achieve saturation in a matter of minutes rather than hours or days. At the high temperature, however, the equilibrium hydrogen pressure is so high that relatively little hydrogen actually dissolves or forms hydride. Accordingly, it is only upon gradual cooling that hydrides form. See, for example, U.S. Pat. No. 4,075,312 (Tanaka et al.) which discloses titanium alloy hydride compositions containing at least one metal selected from the group consisting of vanadium, chromium, manganese, molybdenum, iron, cobalt, and nickel.

J. J. Reilly et al. (Inorganic Chemistry, 1974, vol. 13 at page 218) discloses that intermetallic compounds of iron and titanium, FeTi and $Fe_2Ti$ form iron titanium hydrides. U.S. Pat. No. 4,318,897 (Gonczy) discloses ferrovanadium alloys containing from about 5 to about 30% by weight iron may be used for hydrogen storage systems.

J. F. Lynch et al. in Advances in Chemistry 1978, vol. 167, pages 342–365 discloses that titanium-molybdenum alloys are useful for hydrogen isotope separation. In all these disclosures, an initial induction period at a high temperature in the presence of hydrogen is required for hydride formations.

While many metals require only a single induction process to form the hydride, with the subsequent hydride powder cycling at a reasonable reaction rate, it should be apparent that the induction process represents a distinct disadvantage in forming and utilizing metal hydrides.

BRIEF DESCRIPTION OF THE INVENTION

It had been surprisingly found that certain titanium-based solid solution alloys having a body-centered cubic structure even in bulk form, react rapidly with hydrogen at mild temperatures such as below about 100° C., forming hydrides in a matter of seconds or minutes even at room temperature. Accordingly, the present invention includes a method of producing a metal hydride which comprises reacting hydrogen gas at a temperature between about 0° C. and about 100° C. with a solid solution alloy having a body-centered cubic phase structure and comprising:

(a) a body-centered cubic phase structure comprising titanium and a second metal selected from the group consisting of molybdenum, vanadium and niobium; and (b) dissolved in said body-centered cubic phase structure, wherein said second metal is vanadium or niobium and optionally wherein said second metal is molybdenum, at least about 1 atom percent of a third metal selected from the group consisting of aluminum, cobalt, chromium, iron, manganese, nickel, copper, silicon, germanium, gallium and mixtures thereof; and wherein the reaction rate of said solid solution with hydrogen at said temperature is at least about ten times the reaction rate of unalloyed titanium with hydrogen at said temperature and identical hydrogen pressures.

In addition, the present invention also includes a solid solution composition having a body-centered cubic phase structure and having the formula:

$(Ti_{1-x'}Nb_{x'})_{1-y'}M_{y'}$ wherein M is a metal selected from the group consisting of aluminum, cobalt, chromium, copper, iron, gallium, germanium, silicon, manganese and nickel wherein $0.25 \leq x' \leq 0.95$ and wherein $y'$ varies from at least about 0.01 up to the solubility limit of M in said solid solution composition.

The invention also includes:

A composition comprising $(Ti_{1-a}Mo_a)_{1-b}M_bH_z$ wherein $0.25 \leq a \leq 0.75$ and, wherein b is a non-zero number up to the solubility limit of M in a body-centered cubic phase structure having the formula $(Ti_{1-a}Mo_a)_{1-b}M_b$; and wherein $0.5 \leq z \leq 2$ A composition comprising: $(Ti_{1-x}Nb_x)_{1-y}M_yH_z$ wherein M is a metal selected from the group consisting of aluminum, cobalt, chromium, copper, iron, gallium, germanium, silicon, manganese and nickel and wherein $0.25 \leq x \leq 0.95$ and wherein y varies from at least about 0.01 up to the solubility limit of M in a body-centered cubic phase structure having the formula $(Ti_{1-x}Nb_x)_{1-y}M_y$ and wherein $0.5 \leq z \leq 2$ and A composition comprising $(Ti_{1-q}V_q)_{1-r}M_rH_z$ wherein M is a metal selected from the group consisting of aluminum, cobalt, chromium, copper, iron, gallium, germanium, silicon, manganese and nickel and wherein $0.4 \leq q \leq 0.99$ and wherein $0.01 \leq r \leq 0.2$ and wherein $0.5 \leq z \leq 2$.

DETAILED DESCRIPTION OF THE INVENTION

The present invention involves the reaction of hydrogen gas at low temperature with a solid solution alloy having a body-centered cubic phase structure and including the following systems: Ti/Mo/M, Ti/Mo, Ti/Nb/M and Ti/V/M wherein M is at least 1 atom percent of a third metal such as Al, Co, Cr, Cu, Ni, Fe, Mn, Ga, Ge and Si. The second metal, i.e., Mo, Nb, or V, is chosen to stabilize the solid solution of the titanium-based alloys in the body-centered cubic phase structure at room temperature. The selected third metals recited hereinabove must have atomic radii at least about 5% smaller than the average metallic radius of the binary solid solution alloy comprising titanium and the second metal, i.e., Nb, or V and optionally Mo. The selected third metals effect the capacity of the solid solution alloy (defined as H/M) and the dissociation pressure of the hydride so formed. The hydrogen gas employed may be pure hydrogen, at a pressure above the dissociation pressure of the hydride formed at the reaction temperature, e.g., at subatmospheric, atmospheric or superatmospheric pressures such as between about 0.1 kPa and about 10,000 kPa. Such pressures may also be employed as the partial pressure of hydrogen in a mixture with other gases which do not poison the hydride forming reaction. The hydrogen may be mixed with inert gases such as argon, helium and nitrogen. The present invention may be used as a means of removing hydrogen from such gas mixtures and storage of hydrogen in the form of hydrides of solid solution alloys. The reaction temperature is desirably between about 0° C. and about 100° C. when the reaction is initiated. Because many of the reactions within the scope of the present invention are highly exothermic, it is contemplated that the temperature may, for short times, exceed 100° C. without adverse effect upon the reaction. In fact, in many of the present reactions, heat removal acts as the rate limiting step, with the reaction taking place in seconds if adequate heat removal is provided. It is preferred to initiate the reaction below about 50° C., with room temperature being a convenient place to start.

Titanium metal exists as hexagonal closed packed phase (A3) at room temperature, but transforms to the body-centered cubic phase structure at 882.5° C. The addition of definite amounts of a few selected second metals, namely molybdenum, niobium and vanadium to definite amounts of titanium resulted in the formation of stabilized solid solutions having the body-centered cubic phase structure at room temperature. For example, the addition of definite amounts of vanadium to titanium produced a solid solution such as $Ti_{0.30}V_{0.70}$ that has a stabilized body-centered cubic phase structure at room temperature. We have, surprisingly, discovered that the addition to the stabilized body-centered cubic modification of titanium i.e., Ti/V, Ti/Nb and Ti/Mo of at least about 1 atom percent, e.g., 10 atom percent of certain third metals such as iron, manganese, cobalt, chromium and nickel produced a solid solution having the stabilized body-centered cubic phase structure that rapidly reacted with hydrogen gas at room temperature. In each of the titanium-based solid solutions stabilized by vanadium, the third metal added has a radius which is at least about 5% smaller than the average metallic radius determined from the lattice parameter of the binary solid solution, e.g., $Ti_{0.30}V_{0.70}$.

Similar results were also observed when molybdenum or niobium were used to stabilize the body-centered phase of titanium, i.e., $Ti_{0.70}Mo_{0.30}$ or $Ti_{0.70}Nb_{0.30}$, and the same selected third metals were used to provide increased rates of hydride formation at room temperature. Tables 1–3 summarizes these results.

The solid solution alloys employed in the present invention contain titanium and a second metal selected from the group consisting of molybdenum, niobium and vanadium. The amount of second metal added to titanium is adjusted to stabilize the binary alloy in the body-centered cubic phase structure at room temperature.

The third metal dissolved in the binary alloy is selected from the group consisting of aluminum, cobalt, chromium, copper, manganese, nickel, iron, gallium, germanium and silicon. When the second metal is niobium or vanadium, it is preferred to employ at least about 1 atom percent of third metal. When the second metal is molybdenum, the presence of the third metal is optional, and the amount of said third metal dissolved in the solid solution of titanium and molybdenum is varied from zero up to the solubility limit of said third metal in said solid solution. For those third metals having suitable solubilities, a range of about 2 up to about 15 atom percent of third metal is preferred. It is possible, when using certain third metals such as iron, to exceed the solubility limit of third metal without interfering with the operation of the process of the present invention. Thus, when ferrotitanium or ferrovanadium or ferroniobium is employed to form the tertiary solid solutions of the present invention, it is possible to exceed the solubility limit of iron in the solid solution without adverse effect on the process of the present invention; the excess iron not dissolved has been found not to interfere with the formation of the hydride.

In one embodiment of the present invention, it is preferred to employ a solid solution alloy having the formula:

$(Ti_{1-a}Mo_a)_{1-b}M_b$ wherein $0.25 \leq a \leq 0.75$ and wherein b varies from zero up to the solubility limit of M, the third metal, in said solid solution. The specific third metal selected is employed to vary the dissociation pressure of the resultant metal hydride having the formula $(Ti_{1-a}Mo_a)_{1-b}M_bH_z$ wherein $0.5 \leq z \leq 2$. The storage capacity of the solid solution alloys of Ti-Mo-M varies from at least about 0.5 up to a maximum of about 2 atoms of H per gram-atom of solid solution alloy. For the Ti-Mo solid solution alloy the storage capacity varies from 0.3 up to a maximum of 2 atoms of H per gram-atom of the Ti-Mo solid solution alloy and increases as atom percent of Mo decreases. Thus, in a preferred embodiment, there is employed a solid solution alloy consisting essentially of a composition having the formula:

$Ti_{1-a}Mo_a$ wherein $0.25 \leq a \leq 0.75$ preferably $0.25 \leq a \leq 0.4$ and the storage capacity for preferred range of a varies from at least about 1.80–2 atoms of H per gram atom of Ti-Mo.

In another embodiment of the present invention, it is preferred to employ a solid solution having the formula: $(Ti_{1-x}Nb_x)_{1-y}M_y$ wherein $0.25 \leq x \leq 0.95$ and wherein y varies from at least about 0.01 (1 atom percent) up to the solubility limit of M, the third metal, in said solution; preferably $y \leq 0.05$. Solely for economic reasons, it is preferred to employ iron (as ferroniobium) as the third metal.

Another aspect of the present invention involves a composition comprising $(Ti_{1-x}Nb_x)_{1-y}M_yH_z$ wherein M is said third metal as described herein above, wherein $0.25 \leq x \leq 0.95$ and wherein y varies from at least about 0.01 up to the solubility limit of M in a solid solution having a body-centered cubic structure and having the formula $(Ti_{1-x}Nb_x)_{1-y}M_y$ and wherein $0.5 \leq z \leq 2$. It is preferred to employ smaller amounts of the third metal as atom percent Nb in solid solution increases. Thus, for $0.7 \leq x \leq 0.9$, y, the atomic ratio of the third metal varies from about 0.05 down to about 0.01.

Conversely, as the atomic ratio of niobium in the solid solution is less, larger amounts of the third metal are required. Thus, for $0.3 \leq x \leq 0.5$, y, the atomic ratio of the third metal, is greater than or equal to 0.05 up to the solubility limit of the third metal in said solid solution. The preferred third metal is iron. The solid solution alloy has the composition:

$(Ti_{1-x}Nb_x)_{1-y}Fe_y$ and preferred values of x are in the range of about 0.7 to 0.9 and of y are in the range of about 0.01 up to solubility limit of Fe in said solid solution.

In still another embodiment of the present invention, it is preferred to employ a solid solution having the formula:

$(Ti_{1-q}V_q)_{1-r}M_r$ wherein $0.4 \leq q \leq 0.99$ and wherein $0.01 \leq r \leq 0.2$. Preferred values for q vary from about 0.7 to about 0.9. Preferred values for r vary from about 0.01 to about 0.1; values for r in excess of 0.1, for example, 0.2 may be used but the hydrogen storage capacity of the solid solution alloy drops off. The preferred third metal is iron which is preferred for economic reasons since ferrovanadium or ferrotitanium may be employed to form the solid solution. Solid solutions having the composition:

$(Ti_{1-q}V_q)_{0.90-0.95}Fe_{0.05-0.1}$ wherein $0.6 \leq q \leq 0.9$ are more preferred.

This invention also contemplates the composition comprising:

$(Ti_{1-q}V_q)_{1-r}M_rH_z$ wherein the third metal and values for q and r are as defined hereinabove. A preferred hydride composition comprises:

$(Ti_{1-q}V_q)_{0.90-0.95}Fe_{0.05-0.1}H_z$ wherein $0.7 \leq q \leq 0.99$ and wherein $0.5 \leq z \leq 2$.

In practicing the invention, it is preferred that the solid solution be in bulk form, or otherwise in a form having an average particle size greater than about 1000 micrometers. While solid solutions having particle sizes less than this size react quickly, a rapid rate may also occur for similar materials (e.g., Nb alone) outside the scope of the present invention. The advantages of the present invention, thus, are most significantly achieved when using bulk forms (greater than a millimeter) such as are cast directly from the melt.

In Tables 1–3, times to 80% complete reaction of solid solution alloys with hydrogen gas as 25° C. are listed. In some instances, the "Time to 80% Complete Reaction" at 25° C. is designated as F (Fast), M (Moderate) or S (Slow). By the term "Fast" it is meant that the "Time to 80% Complete Reaction at 25° C." of the solid solution alloy with $H_2$ was less than about 30 minutes. By the term "Moderate", it is meant that the "Time to 80% Complete Reaction at 25° C." of solid solution alloy with $H_2$ was less than about 10 hrs. By the term "Slow", it is meant that there was no measurable reaction of the solid solution alloy with $H_2$ at 25° C. after 3 days. It must be emphasized that the fast rates are minimum rates; faster rates would have been observed if isothermal and isobaric reaction conditions were employed.

The following examples illustrate the present invention and show by comparison certain metals and alloys outside the scope of the present invention which react only slowly with hydrogen at mild temperatures. It should be understood that various additions, deletions and modifications of the examples are contemplated within the scope and spirit of the present invention as set forth in the claims that follow.

EXAMPLE 1

Ti/Nb Solid Solution Alloys with Third Metals

Alloys were prepared by arc melting on a water-cooled copper hearth under argon 10–70 mol % titanium, 30–90 mol % niobium separately with specific amounts of iron, cobalt, nickel, silicon and germanium. Each batch was approximately 4 g. The alloys were cast under argon into buttons approximately 10–12 mm diameter and 7–9 mm height; each button was allowed to cool to near room temperature and remelted; this process was repeated 3–4 times to ensure homogenization. Each button was cracked under pressure and placed in a stainless steel boat inside a quartz tube which was outgassed to a vacuum system. The sample was outgassed while evacuating (about $10^{-7}$ torr) and then cooled to room temperature. Hydrogen was admitted to a pressure of about one atmosphere. A rapid pressure drop was observed in each case, with heat generated so as to form transient temperature as high as 150° C. and perhaps higher in some cases. The buttons fractured violently into powder during the reaction. The reaction was generally complete in less than about ten minutes. The dihydrides can be made either by employing higher hydrogen pressures or by cooling the sample below room temperature. The results are summarized in Table 1. Thus, the fourth line of Table 1 indicates alloy having composition: $(Ti_{0.7}Nb_{0.3})_{0.85}Ge_{0.15}$ reacted at least 80% with hydrogen in about 400 seconds, and the product at equilibrium was: $(Ti_{0.7}Nb_{0.3})_{0.85}Ge_{0.15}H_{1.02}$. Samples were outgassed, i.e. heated at elevated temperatures in the range of 300°–600° C. to remove surface films that would interfere with hydrogen absorption. Freshly prepared samples did not require outgassing prior to reaction with hydrogen.

TABLE 1

Ti/Nb/M Alloys Systems

| Alloy Composition | Time to 80% Complete Reaction at 25° C. (sec) | Hydride Composition[a] |
|---|---|---|
| $Ti_{0.7} Nb_{0.3}$ (Control) | No Rx[1] | 0 |
| $(Ti_{0.7} Nb_{0.3})_{0.95} Ge_{0.05}$ | S | Nd[2] |
| $(Ti_{0.7} Nb_{0.3})_{0.90} Ge_{0.10}$ | S | Nd[2] |
| $(Ti_{0.7} Nb_{0.3})_{0.85} Ge_{0.15}$ | 400 | 1.02 |
| $(Ti_{0.7} Nb_{0.3})_{0.95} Co_{0.05}$ | S | Nd[2] |
| $(Ti_{0.7} Nb_{0.3})_{0.90} Co_{0.10}$ | M[3] | 1.66 |
| $(Ti_{0.7} Nb_{0.3})_{0.85} Co_{0.15}$ | 1000 | 1.57 |
| $(Ti_{0.7} Nb_{0.3})_{0.95} Fe_{0.05}$ | No Rx[4] | 0 |
| $(Ti_{0.7} Nb_{0.3})_{0.90} Fe_{0.10}$ | <1 hour | 1.63 |
| $(Ti_{0.7} Nb_{0.3})_{0.85} Fe_{0.15}$ | 300 | 1.70 |
| $(Ti_{0.7} Nb_{0.3})_{0.78} Fe_{0.22}$[7] | 330 | 1.56 |
| $(Ti_{0.5} Nb_{0.5})_{0.90} Fe_{0.10}$ | F[5] | 1.55 |
| $(Ti_{0.1} Nb_{0.9})_{0.97} Fe_{0.03}$ | <600 | 1.08 |
| $(Ti_{0.8} Nb_{0.2})_{0.85} Fe_{0.15}$ | No Rx | Nd[6] |
| $(Ti_{0.7} Nb_{0.3})_{0.95} Ni_{0.05}$ | S | Nd[2] |
| $(Ti_{0.7} Nb_{0.3})_{0.90} Ni_{0.10}$ | M(ca. 2 hrs) | 1.56 |
| $(Ti_{0.4} Nb_{0.6})_{0.95} Ge_{0.05}$ | 420 | 1.69 |
| $(Ti_{0.5} Nb_{0.5})_{0.94} Ge_{0.06}$ | 270 | 1.68 |
| $(Nb_{0.5}Ti_{0.5})_{.95}Si_{0.05}$ | 360 | 1.58 |

Footnotes to Table 1

[a]Ratio of atoms of H to gram-atoms of solid solution alloy = H/M

[1]Reaction of $Ti_{0.7} Nb_{0.3}$ with $H_2$ proceeds at an insignificant rate at ambient temperature and at 400° C. The amount of $H_2$ absorbed after three days at 25° C. was not appreciable. No reaction with $H_2$ at 400° C. after $Ti_{0.7} Nb_{0.3}$ outgassed at 700° C.

[2]Reaction rate was slow and final hydride composition was not determined.

[3]Reaction rate was moderate; 80% complete reaction in several hours to form hydride H/M = 1.66

[4]No reaction with $H_2$ at room temperature

[5]A larger, 5 g sample button that was not broken into chunks was used. Immediate reaction with 1 atm of $H_2$ and $P_{H_2}$ reached 0 after 15 min. Reloaded $H_2$ pressure to 1 atm, $P_{H_2}$ reached 0 after additional 8 min. Total time to 80% complete reaction was 23 min.

[6]No reaction with $H_2$ at room temperature; slow reaction rate (several hours) at 400° C.

[7]Alloys were prepared using ferroniobium (32 wgt % Fe, 68 Wgt % Nb) obtained from Shieldalloy Corporation, Newfield, N.J.

EXAMPLE 2

The procedure of Example 1 was repeated with alloys of 80–30 mol % titanium and 20–70 mol %, molybdenum. In one case, 5 mol % iron was dissolved in a solid solution containing 70 ml % titanium and 30 mol % molybdenum in accordance with the method of Example 1. After cooling to 25° C. and pressurization with hydrogen (14.7 psi, 100 kPa, 1 atm), a significant drop in hydrogen pressure was observed. See Table 2 for summary of results.

TABLE 2

Ti/Mo, Ti/Mo/Mb Alloy Systems

| Composition of Alloy System | Time to 80% Complete Reaction at 25° C. (sec) | Hydride Compositions[a] |
|---|---|---|
| $Ti_{0.8} Mo_{0.2}$ | S[1] | |
| $Ti_{0.7} Mo_{0.3}$ | 850 | 1.90[2,3] |
| $(Ti_{0.7} Mo_{0.3})_{0.95} Fe_{0.05}$ | <300 | 1.90[4,5] |
| $Ti_{0.65} Mo_{0.35}$ | 450 | 1.91[6] |
| $Ti_{0.6} Mo_{0.4}$ | <600 | 1.81[7] |
| $Ti_{0.55} Mo_{0.45}$ | 600 | 1.42[8] |
| $Ti_{0.4} Mo_{0.6}$ | 200 | 0.55[9] |
| $Ti_{0.3} Mo_{0.7}$ | 130 | 0.30[10] |

Footnotes to Table 2

[a]Ratio of atoms of H to gram-atoms of solid solution alloy = H/M.

[1]$Ti_{0.8} Mo_{0.2}$ (outgassed at 700° C.) showed no measureable absorption of $H_2$ at pressure of 55 atm afteer 15 hrs. at 25° C.

[2]After R.T. outgassing

[3]$Ti_{0.7} Mo_{0.3}$ also reacts at 25° C. (after outgassing at 300° C.) to form hydride, H/M = 1.85

[4]After outgassing at 300° C.

[5]$(Ti_{0.7} Mo_{0.3})_{0.95} Fe_{0.05}$ reacts at 25° C. (after outgassing at 700° C.) to form hydride, H/M = 1.86

[6]$Ti_{0.65} Mo_{0.35}$ reacts (after outgassing at 800° C.) to form hydride, H/M = 1.91

[7]$Ti_{0.6} Mo_{0.4}$ reacts (after outgassing at 300° C.) to form hydride, H/M = 1.81

[8]$Ti_{0.55} Mo_{0.45}$ reacts (after outgassing at 700° C.) to form hydride, H/M = 1.42

[9]$Ti_{0.4} Mo_{0.6}$ reacts (after outgassing at 300° C.) to form hydride, H/M = 0.55

[10]$Ti_{0.3} Mo_{0.7}$ reacts with $H_2$ at a pressure of 55 atm (after outgassing at r.t.) to form hydride, H/M = 0.3

EXAMPLE 3

A series of Ti/V/Fe alloys were prepared by arc-melting as described in Example 1. Each 4 g alloy button was placed in a stainless steel reaction vessel which was then connected to a vacuum system and evacuated for at least one hour at room temperature. Hydrogen was admitted at room temperature to a pressure of 50 atm, and the extent of the reaction was monitored by the pressure decrease of gaseous hydrogen. Hydrogen absorption began immediately, was substantial after 60 seconds, and was completed within about 5 minutes. Compositions of the hydride phases were determined from the total pressure drop in the system at the conclusion of each reaction, and formation of the non-stoichiometric dihydride phases was confirmed by subsequent X-ray diffraction. Typical results are summarized in Table 3.

TABLE 3

Ti/V/Fe System

| Alloy Composition | Time to 80% Complete Reaction at 25° C. (sec.) | Hydride Compositions[a] |
|---|---|---|
| Ti | No Rx[1] | 0 |
| V | No Rx[1] | 0 |
| $Ti_{0.2} V_{0.8}$ | No Rx[1] | 0 |
| $(Ti_{0.10} V_{0.90})_{.90} Fe_{0.10}$ | <600 | 1.09[2] |
| $(Ti_{0.20} V_{0.80})_{.90} Fe_{0.10}$ | " | 1.79 |
| $(Ti_{0.20} V_{0.80})_{.95} Fe_{0.05}$ | " | 0.80 |
| $(Ti_{0.30} V_{0.70})_{.90} Fe_{0.10}$ | " | 1.95 |
| $(Ti_{0.30} V_{0.70})_{.95} Fe_{0.05}$ | " | 1.80[3] |
| $(Ti_{0.40} V_{0.60})_{.90} Fe_{0.10}$ | " | 1.43 |
| $(Ti_{0.40} V_{0.60})_{.92} Fe_{0.08}$ | " | 1.74 |
| $(Ti_{0.50} V_{0.50})_{.90} Fe_{0.10}$ | " | 1.52 |
| $(Ti_{0.60} V_{0.40})_{.90} Fe_{0.10}$ | " | 1.90[4] |

Footnotes to Table 3

[a]Ratio of atoms of H to gram-atoms of solid solution alloys = H/M

[1]No reaction wih $H_2$ after 24 hrs. at room temperature.

[2]X-Ray Diffraction analysis revealed two phase sample and thus indicates that the reaction with $H_2$ did not go to completion.

[3]After $(Ti_{0.3} V_{0.7})_{.95} Fe_{0.05}$ was outgassed at room temperature the reaction with $H_2$ ($P_{H_2}$ = 10 atom) proceeded to form hydride H/M = 0.7 after 30 sec; H/M = 1.4 after 300 sec; H/M = 1.80 after 540 sec.

[4]Reaction of $(Ti_{0.6}V_{0.4})_{0.90} Fe_{0.1}$ outgassed at room temperature, with $H_2$ was slow. After outgassing at 600° C. for 1 hr., hydride formation at room temperaure was immediate; formed a hydride having H/M = 0.7 after 30 sec; H/M = 1.4 after 300 sec; H/M = 1.80 after 540 sec.

[4]Reaction of $(Ti_{0.6} V_{0.4})_{0.90} Fe_{0.1}$ outgassed at room temperature, with $H_2$ was slow. After outgassing at 600° C. for 1 hr, hydride formation at room temperature was immediate.

What is claimed is:

1. A method of producing a metal hydride which comprises reacting hydrogen gas at a temperature between about 0° C. and about 100° C. with a solid solution alloy having a body-centered cubic phase structure and comprising:
   (a) a body-centered cubic phase structure comprising titanium and a second metal selected from the group consisting of molybdenum, vanadium and niobium; and
   (b) dissolved in said body-centered cubic phase structure, wherein said second metal is vanadium or niobium or molybdenum, at least about 1 atom percent of a third metal selected from the group consisting of aluminum, cobalt, chromium, copper, manganese, nickel, iron, gallium, germanium and silicon;

wherein the reaction rate of said solid solution alloy with hydrogen at said temperature is at least about ten times the reaction rate of unalloyed titanium with hydrogen at said temperature and identical hydrogen pressures.

2. The method of claim 1 wherein said solid solution comprises a composition having the formula $(Ti_{1-a}Mo_a)_{1-b}M_b$ wherein $0.25 \leq a \leq 0.75$ and wherein b is a non-zero number up to the solubility limit of M in said solid solution and M is third metal as defined hereinabove.

3. The method of claim 2 wherein M is Fe.

4. The method of claim 1 wherein the solid solution comprises a composition having the formula:

$$(Ti_{1-x}Nb_x)_{1-y}M_y$$

wherein $0.25 \leq x \leq 0.95$ and wherein y varies from at least about 0.01 up to the solubility of M in said solid solution and M is the third metal as defined hereinabove.

5. The method of claim 4 wherein $0.3 \leq x \leq 0.5$ and wherein y varies from at least about 0.05 up to the solubility limit of M.

6. The method of claim 4 wherein $0.7 \leq x \leq 0.9$ and wherein $0.01 \leq y \leq 0.05$.

7. The method of claim 1 wherein the solid solution comprises a composition having the formula:

$$(Ti_{1-q}V_q)_{1-r}M_r$$

wherein $0.4 \leq q \leq$ and wherein $0.01 \leq r \leq 0.2$ and wherein M is the third metal as defined hereinabove.

8. The method of claim 7 wherein M is Fe.

9. A composition comprising:

$$(Ti_{1-a}Mo_a)_{1-b}M_bH_z$$

wherein M is a metal selected from a group consisting of aluminum, cobalt, chromium, copper, iron, gallium, germanium, silicon, manganese and nickel and wherein $0.25 \leq a \leq 0.75$ and wherein b is a non-zero number up to the solubility limit of M in a body-centered cubic phase structure having the formula $(Ti_{1-a}Mo_a)_{1-b}M_b$ and wherein $0.5 \leq z \leq 2$.

10. A composition comprising:

$$(Ti_{1-x}Nb_x)_{1-y}M_yH_z$$

wherein M is a metal selected from the group consisting of aluminum, cobalt, chromium, copper, iron, gallium, germanium, silicon, manganese and nickel and wherein $0.25 \leq x \leq 0.95$ and wherein y varies from at least about 0.01 up to the solubility limit of M in a body-centered cubic structure having the formula $(Ti_{1-x}Nb_x)_{1-y}M_y$ and wherein $0.5 \leq z \leq 2$.

11. A composition comprising:

$$(Ti_{1-q}V_q)_{1-r}M_rH_z$$

wherein M is a metal selected from the group consisting of aluminum, cobalt, chromium, copper, iron, gallium, germanium, silicon, manganese and nickel and wherein $0.4 \leq q \leq 0.99$ and wherein $0.1 \leq r \leq 0.2$ and wherein $0.5 \leq z \leq 2$.

* * * * *

UNITED STATES PATENT AND TRADEMARK OFFICE
CERTIFICATE OF CORRECTION

PATENT NO. : 4,440,736
DATED : April 3, 1984
INVENTOR(S) : Maeland, Libowitz and Rak It is certified that error appears in the above-identified patent and that said Letters Patent are hereby corrected as shown below:

Column 10, line 8, after "$0.4 \leq q \leq$" insert --0.99--

Signed and Sealed this

Twenty-first Day of May 1985

[SEAL]

Attest:

DONALD J. QUIGG

*Attesting Officer*     *Acting Commissioner of Patents and Trademarks*